United States Patent Office 3,846,266
Patented Nov. 5, 1974

3,846,266
PROCESS FOR THE PREPARATION OF HYDRO-
PEROXIDE DERIVATIVES OF POLYMERS
Eduard F. J. Duynstee, Sittard, and Maria E. H. A.
Mevis, Brunssum, Netherlands, assignors to Stamicar-
bon N.V., Seerlen, Netherlands
No Drawing. Filed Dec. 13, 1971, Ser. No. 207,641
Claims priority, application Netherlands, Dec. 16, 1970,
7018306
Int. Cl. C08f 27/22
U.S. Cl. 204—159.2                    17 Claims

ABSTRACT OF THE DISCLOSURE

A process for preparing hydroperoxide derivatives of polymers having polymer backbones, composed only of carbon atoms, and hydroperoxide groups on pendant groups is disclosed. The polymers are produced by subjecting polymers which contain C=C bonds lying in the non-linear part of the polymer chains—that is outside the polymer backbone—the carbon atoms of such bonds either containing two vicinal cis hydrocarbon groups which do not form part of one and the same cyclic system, or else contain at least 3 hydrocarbon groups, to irradiation by light in the presence of oxygen and a photosensitizer. The hydroperoxide derivatives obtained are useful as curing agents or vulcanizing agents in natural and synthetic rubbers, as paper coating resins, as starting materials in the production of graft copolymers, and as ingredients for resins and varnishes.

BACKGROUND OF THE INVENTION

The prior art has proposed many processes to produce polymers, both saturated and unsaturated, containing hydroperoxide groups, by means of oxidation reactions with peroxide compounds, such as persulphates and peroxides, or by means of autocatalytic oxidation reactions. These prior art processes, however, result in the reduction of polymer derivatives wherein some hydroperoxide groups are formed but a large variety of other oxygen-containing groups, such as hydroxyl groups, ketone groups, aldehyde groups, carboxyl groups, and ester groups are formed. The efficiency of such processes, in terms of the hydroperoxide groups formed, is quite small, and oxygen-containing groups develop in the polymer chains which are, in some instances, detrimental to the properties of the resulting polymer. In addition, such prior art processes also give rise to a certain amount of chain rupture, with the resulting production of a great number of varying compounds which also detrimentally affect the properties of the resulting polymer.

U.S. Pat. 3,484,353 discloses a process for preparing hydroperoxide derivatives of polymers which have an intra-linear C=C unsaturation in the polymer backbone by subjecting such polymers to irradiation by visible light in the presence of oxygen and a photosensitizer.

However, the prior art has failed in attempts to oxidize polymers having C=C unsaturation located in pendant groups—that is, outside the polymer backbones of the polymer to polymers, wherein the oxygen containing groups produced are mainly hydroperoxide groups. For instance, a copolymer of ethylene, propylene, and dicyclopentadiene, which copolymer does not possess polymer backbone unsaturation, cannot be converted into a hydroperoxide derivative by means of a photo-oxidation reaction described in U.S. Pat. 3,484,353.

SUMMARY OF THE INVENTION

The present invention is directed to a process for preparing hydroperoxide derivatives of polymers which contain C=C bonds outside the polymer back-bone of the polymer chains, wherein the oxygen containing groups produced are mainly hydroperoxide groups. Polymers containing C=C bonds lying in the non-linear part of the polymer chains—that is pendant to the polymer backbone—the carbon atoms of which bonds either (a) carry two vicinal cis hydrocarbon groups which do not form part of the same cyclic system, or else (b) carry at least three hydrocarbon groups, are subjected to irradiation by light in the presence of oxygen and a photosensitizer.

DESCRIPTION OF THE INVENTION

Hydroperoxide derivatives of polymers having backbones composed only of carbon atoms are prepared by irradiating the polymers with light in the presence of oxygen and a photosensitizer, wherein the polymers have pendant substituents or portions which contain C=C bonds, the carbon atoms of said bonds either carry two vicinal cis hydrocarbon groups which do not form part of one and the same cyclic system, or carry at least three hydrocarbon groups.

The polymers which can be oxidized according to the present invention are those polymers containing C=C bonds outside the polymer backbone which either (a) carry two hydrocarbon groups whose relative positions are vicinal cis and which together do not form part of one and the same cyclic system, or (b) carry three hydrocarbon groups. Other copolymers wherein these conditions are not met, such as, for instance, a copolymer of ethylene, propylene and dicyclopentadiene, will not result in the formation of peroxide derivatives of the polymer when subjected to the process of the present invention.

Of course, at least one of the hydrocarbon groups carried by the C=C bond is linked with at least one carbon atom of the polymer chain or backbone. Such hydrocarbon group is considered to include the carbon atom in the linear portion of the polymer chain, the polymer backbone, to which the C=C bond is connected.

A wide variety of polymers, which can be prepared in many different ways, can be used in the process of the present invention. A particular method of preparing the polymers does not form part of the present invention, although such preparation methods as radical polymerization, coordination polymerization, anionic or cationic polymerization, can be mentioned, as well as any other mode of polymerization. The polymer may be a homopolymer, a copolymer, a block copolymer, or other type of polymers known to the art. If the polymer is produced from more than one monomer, the nature of the comonomers which do not carry the C=C bonds required for the photo-oxidation reaction of the present process is of little importance, as, by themselves, the presence and nature of such comonomers have no influence on the process of the present invention.

If the C=C bonds of the polymer which is used carry two hydrocarbon groups whose relative positions are vicinal cis and which together do not form part of one and the same cyclic system, the hydrocarbon groups may be aryl groups, aralkyl groups, alkaryl groups, cycloalkyl groups, or alkyl groups containing 1–18 carbon atoms, more preferably 1–8 carbon atoms. Preferably, such polymers contain units of the formula

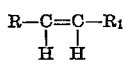

wherein R and $R_1$ are independently selected from the group consisting of alkyl, cycloalkyl, aryl, alkaryl and aralkyl of 1–18 carbon atoms, provided, however, that at least one of R or $R_1$ is connected to the backbone of the polymer. The substituents R and $R_1$ should be in the cis position. Typical examples of monomers which can be incorporated into polymers to produce units of the above formula include hexadiene-1,4, 6-methylheptadiene-1,4, 1-vinyl-4-(propenyl-1)-cyclohexane, 6-phenylhexadiene-1,4-3-isopropylhexadiene-1,4 and 4(1-butenyl-2)styrene.

If the C=C bonds outside the backbone of the polymer contain at least 3 hydrocarbon groups, these hydrocarbon groups may be alkyl, cycloalkyl, aryl, alkaryl or aralkyl groups containing 1–18 carbon atoms, preferably 1–8 carbon atoms. Examples of polymers having such unsaturated pendant groups are those polymers which incorporate the following monomers 5-methyl-hexadiene-1,4, 4-ethyl-hexadiene-1,4, 4-isopropyl-hexadiene-1,4, 4,5-dimethylhexadiene-1,4, 5-methyloctadiene-1,5, 6-methyloctadiene-1,5, 6-methylheptadiene-1,5, 5,7-dimethyloctadiene-1,5, 4,5-dipropyloctadiene-1,4 5-propyl-6-methylheptadiene-1,5, 6-phenyl-4-propylhexadiene-1,4, 5-ethyl-7-methyl-octadiene-1,6 and 4-(2-buten-2-yl)-styrene. If the C=C bonds outside the backbone of the polymer chains carry at least 3 hydrocarbon groups, it is possible for two of the hydrocarbon groups which are carried by these C=C bonds in geminal or vicinal relative positions to form part of a cyclic system. Examples of such cyclic systems are the cyclooctene system, the bicyclo(2,2,1)-heptene system, the bicyclo(2,2,2)octene system, the dicyclopentadiene system, the tetrahydro-indene system, the bicyclo(4,4,0)decadiene system, the bicyclo-(3,2,0)heptene system and the bicyclo(3,3,0)octadiene system. Typical examples of monomers which can be incorporated into polymers to produce such cyclic sysetms include 4-methylcyclooctadiene-1,4,
4-methyl-5-propylcyclooctadiene-1,4,
5-ethylidenenorbornene-2,
5-propylidene-norbornene-2,
5-butylidenenorbornene-2,
5-isopropylidene-norbornene-2,
2-methylnorbornadiene-2,5,
2-propylnorbornadiene-2,5,
3-heptyl-norbornadiene-2,5,
2-ethyl-3-propylnorbornadiene-2,5,
2-(1',5'-dimethyl-hexen-4-yl)-norbornadiene-2,5,
5-isopropylidene-bicyclo(2,2,2)-octene-2,
5-ethylidenebicyclo(2,2,2)octene-2,
5-butylidenebicyclo(2,2,2)-octene-2,
2-ethylbicyclo(2,2,2)octadiene-2,5,
2-methyl-3-ethylbicyclo(2,2,2)octadiene-2,5,
2-hexylbicyclo(2,2,2)octadiene-2,5,
2-(1',5'-dimethyl-hexenyl-4)bicyclo(2,2,2)octadiene-2,5,
5-methyldicyclopentadiene,
4-methyl-5-ethyldicyclopentadiene,
5-isopropyldicyclopentadiene,
3-methyl-4,7,8,9-tetrahydroindene,
2-propyl-4,7,8,9-tetrahydro-indene,
1-isopropylidene-4,7,8,9-tetrahydro-indene,
1-(1'-phenyl)ethylidene-4,7,8,9-tetrahydro-indene,
1-isopropylidenebicyclo(4,4,0)decadiene-2,6,
2-isopropylidenebicyclo(4,4,0)decene-6,
2-ethylidenebicyclo(4,4,0)decene-6,
3-ethylbicyclo(3,2,0)-heptadiene-2,6,
3-methylbicyclo(3,3,0)-octadiene-2,6 and the like.

Preferably, such C=C bonds are carried on pendant substituents having the formula

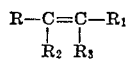

wherein R and $R_1$ have been defined above and $R_2$ and $R_3$ are independently selected from the group consisting of hydrogen, alkyl, cycloalkyl, aryl, alkaryl and aralkyl of 1–18 carbon atoms, provided, however, that both of $R_2$ and $R_3$ are not hydrogen, or two of R, $R_1$, $R_2$ and $R_3$ may be combined to form a cyclic ring system, provided, however, that at least one of R, $R_1$, $R_2$ and $R_3$ is connected to the backbone of the polymer.

As mentioned above, when a copolymer is used, the nature of comonomers therein which do not produce the pendant C=C bonds does not affect the photo-oxidation process of the present invention. The comonomer can therefore be any monomer which is copolymerizable with the monomer or monomers which contribute the required pendant unsaturation. Mention may be made of, by way of example, α-olefins of 2–12 carbon atoms such as ethylene, propylene, butylene-1, heptylene, conjugated dienes such as butadiene-1,4, isoprene and methylbutadiene, and styrene and styrene derivatives such as α-methylstyrene, α-chlorostyrene and the like, as well as vinyl toluene, and divinylbenzene.

The term "photo-oxidation" as used herein, is used in the same sense as in the aforesaid U.S. Pat. 3,484,353, to refer to oxidation in which light and a photosensitizer convert triplet oxygen to singlet oxygen, which singlet oxygen subsequently is involved in the polymer oxidation. It should be understood that this term does not include light-catalyzed auto-oxidation, wherein light is used to form compounds in the excited condition which excited compounds then form radicals by hydrogen abstraction of the polymer, whereupon such radicals can react with triplet oxygen in the same way as auto-oxidation reactions which are not catalyzed by light. Photo-oxidation reactions can be distinguished from auto-oxidation reactions by the use of oxidation inhibitors, as oxidation inhibitors do not delay a photo-oxidation reaction but do delay an auto-oxidation reaction.

The light which is used in the process of the present invention may vary considerably in wavelength, conveniently from 3,000 to 8,000 angstroms, although visible light is preferred. The light that is used can be monochromatic or polychromatic. The effectiveness of the light which is used is closely tied to the choice of the particular photosensitizer which is used in the process of this invention. For the process to exhibit good effectiveness, the light which is used should be absorbed in a sufficient measure by the photosensitizer. Light having wavelengths other than those in the visible range do produce a certain degree of photo-oxidation with formation of hydroperoxide groups in the polymer, but also give rise to auto-oxidation reactions, photodecomposition and other radical reactions which may lead to the formation of undesired products.

The process of the present invention can be carried out at virtually any temperature, although it is preferred to conduct the process at a temperature of between —50° C. and 100° C., and more preefrably between 0° C. and 40° C. The photo-oxidation reaction rate is practically independent of the temperature. As will be readily appreciated, temperatures should be avoided which are such that the hydroperoxide groups produced immediately decompose after formation, and this temperature of hydroperoxide group decomposition is highly dependent upon the nature of the particular polymer used.

The process of this invention can be used to oxidize polymers which are in a dissolved or a dispersed state or in latex form or in solid form. The process can be conducted in the presence of various other materials such as, for instance, suspending agents, pigments, fillers, antioxidants and the like, as long as such other materials do not adversely affect the photo-oxidation reaction.

If the process of the present invention is conducted with the polymer in the dissolved form, the choice of the particular reaction solvent will be strongly determined by the solubility of the particular polymer used in the solvent. Generally, the solvents will be saturated hydrocarbons, such as alkanes, of 1–18 carbon atoms in length, such as n-pentane, n-hexane, iso-octane, n-octane, nonane and decane and aromatic hydrocarbons, such as benzene and toluene. Other solvents may be suitably used if the polymer is soluble therein, including pyridine, tetrahydrofuran, acetone, alcohols such as methanol and ethanol, and dimethylsulfoxide. As mentioned above, the process of the present invention can also be conducted with the polymer in the solid state. For instance, it is possible to utilize a polymer in the form of a powder or even in the form of a shaped product, in which a photosensitizer is incorporated.

The oxygen concentration is preferably chosen to be high enough that it is not controlling the photooxidation rate. It is preferred, therefore, that the oxygen be supplied to the photo-oxidation reaction zone at a rate which is at least equal to the oxygen absorption rate of the polymer. The oxygen may be bubbled through a solution of the polymer or a polymer latex, or may be aspirated by such solution, latex or solid polymer. Pure oxygen may be used as well as oxygen diluted with inert gases, such as nitrogen. Air is highly suitable for use in the process of the present invention.

Any photosensitizer may be used in the process of the present invention, although the effectiveness of a given photosensitizer may vary greatly depending upon the wavelength of the light applied. The photosensitizers disclosed in U.S. Pat. 3,484,353, the disclosure of which is hereby incorporated by reference are suitable for use in the process of the present invention. Among suitable photosensitizers may be mentioned porphin derivatives, such as tetraphenylporphin, as well as chlorophyll, casine, methylene blue, methyl violet, fluorescein, hemin, anthracene, acridine and Rose Bengal. The amount of photosensitizer used may vary within wide limits but normally only small amounts will be utilized. Generally, the amount of photosensitizer used will be between 0.001 and 1% by weight, based on the weight of the polymer.

The hydroperoxide groups—containing polymers of the present invention can vary widely in hydroperoxide content, depending on the particular end use intended. Generally, the polymer will contain from 0.001 to 20 hydroperoxide groups for each 100 carbon atoms in the polymer, preferably from 0.01 to 10 peroxide groups.

A plurality of light sources may be used if desired. It is preferred to agitate the photo-oxidation reaction medium during the photo-oxidation reaction.

The hydroperoxide derivatives obtained by the process of the present invention have a number of different uses, among which may be mentioned curing or vulcanizing agents for natural and synthetic rubber, as paper coating materials, and in resins and varnishes and graft polymerizations.

The polymers which are used as starting materials in the process of the present invention may, of course, have other pendant groups carried by the polymer backbone. The only significant groups, however, are those with C=C unsaturation. It is preferred that the polymer backbone have no C=C unsaturation, and that the polymer have an iodine number of at least 0.01. Generally, the iodine value of the polymer will not be larger than 200, and preferably the iodine number is between 100 and 0.1.

EXAMPLES OF THE INVENTION

Example 1

The invention will be understood more readily by reference to the following examples; however, these examples are intended to illustrate the invention and are not to be construed to limit the scope of the invention.

10.6 g. of ethylene-propylene-hexadiene copolymer, commercially available under the trade name Nordel 1070, having 2.7% by weight of hexadiene-1,4 units in the trans position and 0.3% by weight of hexadiene-1,4 units in the cis position, and 41% by weight of propylene units, were dissolved in 220 ml. of benzene and charged to a glass reaction vessel having a stirrer, thermometer, an oxygen inlet tube and a discharge tube. Thereafter, molecular oxygen was passed through the solution at a gas rate of 30 liters per hour until the solution was saturated with oxygen, whereupon the reaction vessel was connected to a gas burette. A 500 w. high-pressure mercury lamp (Philips SP 500) provided with a glass filter and lcoated 8 cm. under the reaction vessel was lit, while the oxygen flow was maintained and the solution was stirred at a temperature of 20° C. After 10 minutes, no measurable quantity of oxygen had been absorbed by the polymer solution. Thereafter 0.7 mg. of tetraphenylporphin was added to the solution, whereupon the photo-oxidation reaction was initiated and oxygen was absorbed by the polymer solution. After 10 minutes the oxygen absorption rate appeared to decrease strongly. At that time, 7.9 had been absorbed by the solution, which amounted to 0.35 mmoles of oxygen, which was practically equal to the amount of cis hexadiene-1,4 units (0.39 mm.) contained in the sample.

Iodometric titration established that the sample contained 0.32 mmoles of hydroperoxide.

Comparative Example A

Example 1 was repeated using a solution of 10.1 g. of an ethylene-propylene-dicyclopentadiene copolymer containing 5.2% by weight of dicyclopentadiene units and 40% by weight of propylene units. 4 hours after the addition of the photosensitizer (the tetraphenylporphin) to the reaction vessel, no measurable amount of oxygen had been absorbed by the solution.

This comparative example illustrates that copolymers having non-linear C=C bonds which carry 2 hydrocarbon groups whose relative positions are vicinal and which are bound to each other by a ring structure cannot be converted to hydroperoxide derivatives using the process of the present invention.

Example 2

Example 1 was repeated using 11.1 g. of copolymer which had been prepared from ethylene, 42% by weight of propylene, and 2.8% by weight of a mixture of 3-methyl- and 4-methyldicyclopentadiene (which had been produced by codimerization of cyclopentadiene and methylcyclopentadiene), dissolved in 200 ml. of benzene. The photo-oxidation reaction appeared to commence after the addition of the tetraphenylporphin, as evidenced by the rapid oxygen absorption by the polymer solution. After 315 minutes, 71 ml. of oxygen had been absorbed, corresponding to 3.16 mmoles of oxygen.

Iodometric titration indicated that the copolymer contained 2.8 mmoles of hydroperoxide.

Example 3

Example 2 was repeated, using 9.9 g. of a copolymer of ethylene, propylene and 5-ethylidenenorbornene-2, containing 38% by weight of propylene units and 3.4% by weight of ethylidenenorbornene units. After tthe solution had been saturated with oxygen, 78.1 mg. of tetraphenylporphin were added. After 10 minutes, no perceptible oxygen absorption had been observed. The photo-oxidation reaction commenced upon the lighting of the mercury lamp, and after 12½ minutes the oxygen absorption was terminated. During this time, 65 ml. of oxygen had been absorbed, corresponding to 2.9 mmoles of oxygen.

Iodometric titration established that the copolymer contained 2.5 mmoles of hydroperoxide, making it clear that practically all oxygen which had been absorbed by the copolymer was in the form of hydroperoxide groups.

Example 4

Example 2 was repeated, using 10.0 g. of an ethylene-propylene-5-ethylidenenorbornene-2 copolymer containing 6% by weight of 5-ethylidene-norbornene-2 units and 41% by weight of propylene units. After the addition of the tetraphenolporphin photosensitizer, 140 ml. of oxygen were absorbed over a period of 9 minutes, corresponding to 6.2 mmoles of oxygen absorbed.

Iodometric titration indicated that the polymer contained 5.8 mmoles of hydroperoxide groups.

Example 5

Example 4 was repeated except that the oxygen was passed over the agitated polymer solution instead of being bubbled through the solution. The photo-oxidation reaction commenced, as was evident from the rapid oxygen absorption by the polymer solution, after the addition of the tetraphenylporphin photosensitizer. After 64 minutes the reaction was discontinued by extinguishing the mercury lamp. During the 64 minutes that the lamp was lit, 62 ml. of oxygen, corresponding to 2.78 mmoles of oxygen, had been absorbed by the polymer solution.

Iodometric titration indicated that the resulting polymer contained 2.58 mmoles of hydroperoxide.

Example 6

Example 1 was repeated, using 95 g. of a latex containing 39.9 g. of a copolymer of ethylene, propylene and 5-ethylidenenorbornene-2 containing 41% by weight of propylene units and 7.5% by weight of 5-ethylidenenorbornene-2 units. 1.8% by weight of potassium oleate was used as the latex emulsifier. 40 mg. of methylene blue was used as the photosensitizer instead of the tetraphenylporphin. The latex was thoroughly agitated and the oxygen was passed over the latex, instead of being bubbled therethrough. After 5½ hours, 434 ml. of oxygen, corresponding to 19.4 mmoles of oxygen, had been absorbed.

Iodometric titration of the polymer two days later still showed that the polymer contained 5.7 mmoles of hydroperoxide.

Example 7

Example 5 was repeated, using 3.8 g. of a copolymer of ethylene and 5-ethylidenenorbornene-2, containing 33% by weight of 5-ethylidenenorbornene-2 units, dissolved in 210 ml. of benzene. 0.8 mg. of tetraphenylporphin was used as the photosensitizer, and after the addition of the tetraphenylporphin, the oxygen was rapidly absorbed. After 22 minutes, 220 ml. of oxygen, corresponding to 9.8 mmoles of oxygen, had been consumed. Iodometric titration indicated that the copolymer contained 6.8 mmoles of hydroperoxide.

Example 8

Example 7 was repeated, using 2 g. of a copolymer of ethylene and 4-methylhexadiene-1,4 containing 20% by weight of 4-methylhexadiene in 190 ml. of benzene. After the photosensitizer had been added, oxygen was rapidly absorbed by the polymer solution. After 60 minutes the oxygen absorption rate had decreased considerably and the reaction was discontinued by extinguishing the mercury lamp. During the 60 minute period that the lamp had been lit, 91 ml. of oxygen, corresponding to 4.0 mmoles of oxygen had been absorbed.

Iodometric titration indicated that the copolymer contained 3.2 mmoles of hydroperoxide.

What is claimed is:

1. A photooxidation process for the preparation of hydroperoxide derivatives of polymers having a saturated polymer backbone composed only of carbon atoms and having C=C unsaturation located in pendant groups, said polymers derived from at least one mono-olefin and at least one non-conjugated diolefin monomer, said process comprising photooxidizing, without substantially autooxidizing said polymers by irradiating said polymers with light capable of catalyzing said reaction and of a wavelength of 3000 to 8000 angstroms in the presence of at least a stoichiometric amount of oxygen and a sensitizing amount of a photosensitizer, wherein the carbon atoms of said C=C bonds either (a) carry two vicinal cis hydrocarbon groups which do not form part of one and the same cyclic system, or else (b) carry at least three hydrocarbon groups, and wherein triplet oxygen is converted to singlet oxygen.

2. The process as claimed in claim 1, wherein said light is visible light.

3. The process as claimed in claim 1, wherein the carbon atoms of said bonds contain 2 hydrocarbon groups whose relative positions are vicinal cis.

4. The process as claimed in claim 3, wherein said hydrocarbon groups contain from 1-18 carbon atoms.

5. The process as claimed in claim 4 wherein said groups contain from 1-8 carbon atoms.

6. The process as claimed in claim 1, wherein the carbon atoms of said bonds carry at least 3 hydrocarbon groups.

7. The process as claimed in claim 6, wherein, said hydrocarbon groups contain from 1-18 carbon atoms.

8. The process as claimed in claim 7, wherein said hydrocarbon groups contain from 1-8 carbon atoms.

9. The process as claimed in claim 6, wherein two of said hydrocarbon groups are in vicinal or geminal relative positions and together form a ring structure.

10. The process as claimed in claim 9, wherein said ring structure is a bicyclo(2,2,1)heptene ring structure.

11. The process as claimed in claim 9, wherein said ring structure is a cyclooctene ring structure.

12. The process as claimed in claim 9, wherein said ring structure is a bicyclo(2,2,2)octene ring structure.

13. The process as claimed in claim 9, wherein said ring structure is a hexahydroindene ring structure.

14. The process as claimed in claim 9, wherein said ring structure is a bicyclo(2,2,1)pentene ring structure.

15. The process as claimed in claim 1, wherein said polymer substantially consists of units derived from at least 1 α-alkene and from 5-ethylidenenorbornene-2.

16. The process as claimed in claim 1, wherein said pendant groups are of the formula

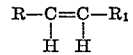

wherein R and R$_1$ are in the cis position and are independently selected from the group consisting of alkyl, cycloalkyl, aryl, alkaryl and aralkyl of 1–18 carbon atoms, provided, however, that at least one of R or R$_1$ is connected to the backbone of the polymer.

17. The process as claimed in claim 1, wherein said pendant groups are of the formula

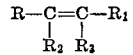

wherein R$_1$ and R$_2$ are independently selected from the group consisting of alkyl, cycloalkyl, aryl, alkaryl and aralkyl of 1–18 carbon atoms and R$_2$ and R$_3$ are independently selected from the group consisting of hydrogen, alkyl, cycloalkyl, aryl, alkaryl and aralkyl of 1–18 carbon atoms, provided, however, that both of R$_2$ and R$_3$ are not hydrogen, or two of R, R$_1$, R$_2$ and R$_3$ may be combined to form a cyclic ring system, provided, however, that at least one of R, R$_1$, R$_2$ and R$_3$ is connected to the backbone of the polymer.

References Cited
UNITED STATES PATENTS

| | | | |
|---|---|---|---|
| 2,911,398 | 11/1959 | Vandenberg | 260—93.5 |
| 3,020,174 | 2/1962 | Natta | 117—47 |
| 3,271,477 | 9/1966 | Kresge | 260—877 |
| 3,322,661 | 5/1967 | Yoshikawa | 204—159.17 |
| 3,458,597 | 7/1969 | Jabloner | 260—877 |
| 3,483,273 | 12/1969 | Pruchal | 260—878 |
| 3,484,335 | 12/1969 | Wismer | 161—160 |
| 3,489,822 | 1/1970 | Witt | 260—878 |
| 3,484,353 | 12/1969 | Sharp | 204—159.23 |

JOSEPH L. SCHOFER, Primary Examiner

E. J. SMITH, Assistant Examiner

U.S. Cl. X.R.

260—80.78, 88.2D, 88.2E, 877